United States Patent [19]

Emery

[11] Patent Number: 5,098,154
[45] Date of Patent: Mar. 24, 1992

[54] REVERSIBLE SEAT STRUCTURE

[76] Inventor: Charles E. Emery, 3515 South Boston, Fort Smith, Ark. 72903

[21] Appl. No.: 639,266

[22] Filed: Jan. 10, 1991

[51] Int. Cl.$^5$ .............................................. B60N 2/02
[52] U.S. Cl. ......................................... 297/92; 297/328
[58] Field of Search .................. 297/92, 93, 101, 103, 297/328, 327, 326, 325, 1; 5/47, 48

[56] References Cited

U.S. PATENT DOCUMENTS

| | | |
|---|---|---|
| 551,326 | 10/1895 | Norcross ................................ 297/92 |
| 2,019,266 | 10/1935 | Meilves ................................. 297/92 |
| 3,856,347 | 12/1974 | Bell et al. . | |
| 3,955,846 | 5/1976 | Murphy ................................ 297/93 |
| 3,964,785 | 6/1976 | Plume ................................... 297/92 |

Primary Examiner—Kenneth J. Dorner
Assistant Examiner—James M. Gardner

[57] ABSTRACT

A reversible seat structure that can be easily moved between two operating positions (facing in opposite directions). The operating mechanism is functional without the necessity for extraneous latches or other hold down devices. In its two operating positions the seat structure is adequately supported by a combination of stabilizer links and pedestal mechanism.

11 Claims, 1 Drawing Sheet

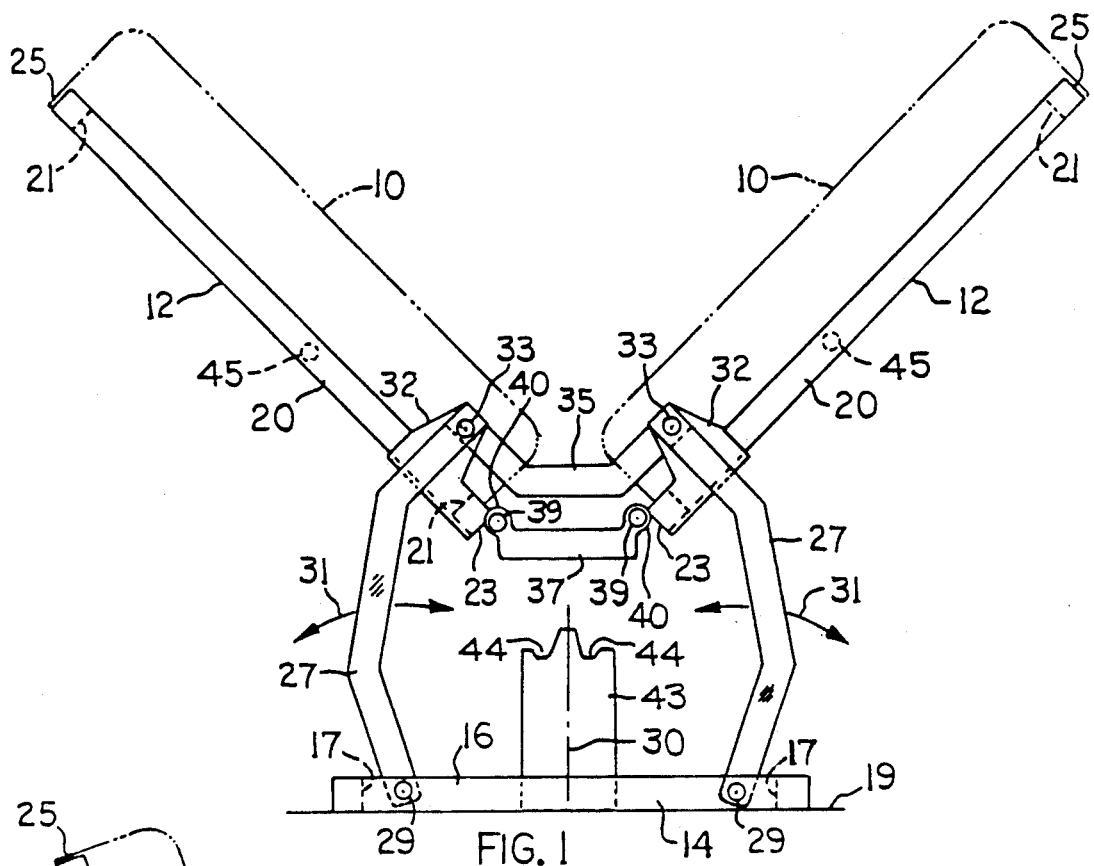
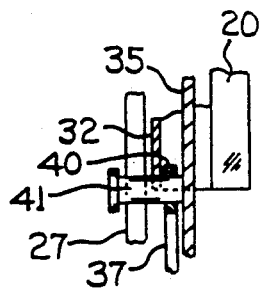
FIG. 3
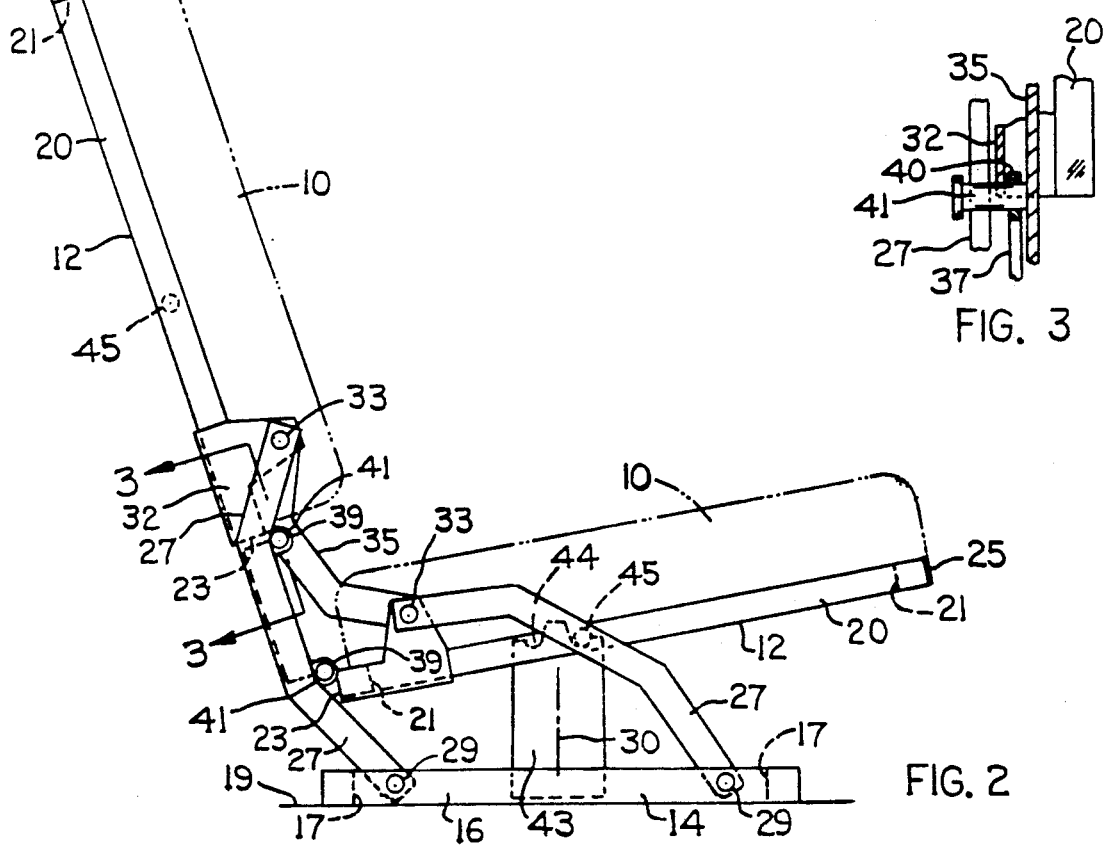

REVERSIBLE SEAT STRUCTURE

BACKGROUND AND SUMMARY OF THE INVENTION

This invention relates to a reversible seat, i.e. a seat structure wherein the seated occupants can face in either of two directions, depending on the adjusted position of the structure. The reversible seat structure has special utility in van type vehicles; the seat occupants can face either forward or backward according to individual preference. The reversible seat structure might also find use in passenger trains or in the home (e.g. facing a television set or facing away from the television set).

The reversible seat structure of this invention is in some respects similar to a reversible seat structure shown in U.S. Pat. No. 3,856,347 issued to R. Bell et.al. However, my proposed seat structure is believed to have some advantages over the structure disclosed by Bell et al. For example, in my proposed structure the base portion has a relatively small front-to-rear dimension (when compared to the corresponding dimension of the seat portion). This feature enables the structure to take up comparatively small space in a van type vehicle without such projections as might limit individual leg room or unduly reduce cargo area behind the seat structure. Also, my proposed seat structure is designed to be very stable (not shiftable back and forth) in either position of adjustment; no special latches or hold down devices are required, although such devices can be used if desired as an added safety measure. The seat structure disclosed by Bell et al apparently requires special latches in order to hold the structure in its adjusted positions. As another feature of interest, in my proposed seat structure the linkage used to move the structure between its two positions of adjustment is located below (or behind) the seat cushion and back cushion; the linkage can be entirely concealed or recessed so that it does not detract from the seat structure appearance or form a potentially dangerous projection. The linkage used in the Bell et al seat structure projects upwardly or outwardly from the cushion support frames so that it is not so easily concealed as in my proposed arrangement.

THE DRAWINGS

FIG. 1 is a side elevational view of a reversible seat structure embodying my invention. The cushions for the seat structure are shown in dashed lines in order to better show the linkage that is used to adjust and support the back and seat portions of the structure.

FIG. 2 is a view in the same direction as FIG. 1, but showing the structure in a different condition of adjustment.

FIG. 3 is a fragmentary view taken on line 3—3 in FIG. 2.

DESCRIPTION OF A PREFERRED EMBODIMENT OF THE INVENTION

FIGS. 1 and 2 show a reversible seat structure having two identical seat cushions 10 supported on separate frames 12. FIG. 2 shows the structure in position so that a person can sit facing to the right with his/her back facing to the left. FIG. 1 shows the seat structure in a transitional position midway between the rightward-facing position of FIG. 2 and a non-illustrated position facing to the left. When the structure is oriented to face leftwardly the seat cushion (in FIG. 1 becomes the back cushion, and the back cushion (of FIG. 1) becomes the seat cushion. The arrangement is broadly similar to the arrangement depicted in aforementioned U.S. Pat. No. 3,856,347.

The illustrated seat structure comprises a flat base 14 that includes two side rails 16, 16 and two transverse connecting rails 17. Only one of the side rails is visible in the drawings. The non-illustrated side rail is located behind the plane of the paper. Base 14 is suitable for bolt-down attachment to the floor 19 of a van type vehicle.

Each cushion support frame 12 comprises two side members 20 interconnected by transverse bars 21, 21; the support frame has a generally rectangular plan configuration to form a suitable platform for the associated cushion 10. The two frames 12 are arranged with transverse end edges 23 thereof relatively close together, and with transverse edges 25 relatively far apart.

Two separate arm structures 27 are trained between base 14 and the corresponding side members 20 of cushion support frames 12. Each arm structure 27 includes two similarly configured spaced-apart arm elements having first pivot connections 29 to the side rails of base 14; only one arm element of each arm structure 27 is visible in the drawings. Arm structures 27, 27 are arranged in confronting (facing) relation, with pivot connections 29 equidistant from transverse centerplane (or line) 30 taken vertically through base 14. Each arm structure 27 can swing in either direction from its FIG. 1 position, as indicated by the directional arrows 31. The arm structures are indirectly linked together at their upper ends so that when one arm structure 27 is moving toward (and across) centerline 30 the other arm structure is moving away from the centerline.

The upper ends of arms structures 27 have second pivot connections 33 with side members 20 of cushion support frames 12. Pivot connections 33 are located relatively close to transverse end edges 23 of frames 12 and slightly above the general plane of each frame (as defined by side members 20); a bracket 32 may be attached to each side of member 20 of each frame 12 to form an attachment surface for pivot connection 33. Frames 12 can be formed out of hollow square cross-sectioned tubing. Brackets 32 can be L-shaped in transverse cross section, with one leg of the L attached to frame side member 20, and with the other leg of the L connected to pivot pin 33.

An upper stabilizer link means 35 extends across the space between the pivot connections 33, such that the link means is swingably related to arm structures 27 and also to both frames 12. Pivot connections 33 comprise pivot pins that are axially elongated to extend through the three structures (32, 27 and 35). It will be understood that link means 35 comprises two separate transversely spaced link elements, one along each side of frame 12.

A lower stabilizer link means 37 has third pivotal connections 39 with frames 12, 12 at the frame transverse end edges 23. Each pivot connection 39 can comprise a circular pin 41 welded to frame bracket 32 and extending through a collar portion 40 of an associated link element 37, as shown generally in FIG. 3. Each pin can extend outwardly across the movement plane of the associated arm element (structure) 27; the extended portion of each pin 41 forms an abutment mechanism that is adapted to contact an edge of an associated arm structure (element) 27 to limit arm structure movement (as shown in FIG. 2).

FIG. 1 shows the linkage in a transitional position midway between its two operational positions. Movement of the linkage from the FIG. 1 position to the FIG. 2 position can be obtained by exerting a leftward pulling motion on the leftmost cushion support frame 12. Arm structures 27 swing leftwardly such that stabilizer links 35 and 37 buckle downwardly around the leftmost pivot connections 33 and 39. Eventually the elongated pins 41 (pivot connections 39) engage edge areas of the leftmost arm structures 27 to prevent any further leftward motion of the system (as shown in FIG. 2). In the FIG. 2 position the leftmost cushion 10 serves as a seat back (the associated frame 12 is in an upright position); the rightmost cushion 10 serves as the seating surface (the associated frame 12 is in a prone position).

By exerting a rightward pull on the rightmost frame 12 it is possible to reverse the positions of cushions 10 (but with the seat facing leftwardly instead of rightwardly). In this connection, it will be seen that FIG. 1 represents an intermediate position of the system, such that rightward motion of the system from the FIG. 1 position will give a mirror image of the FIG. 2 condition, i.e. a leftwardly-facing seat structure.

Abutment mechanism 41, 41 stabilizes the position of the upright cushion support frame 12. However, the prone cushion support frame 12 requires some additional support in order to carry a person's weight. There is shown in the drawings a pedestal mechanism 30 43 attached to base 14 at the base transverse centerline 30; mechanism 43 comprises two tranversely spaced pedestal members attached to side rails 14 of the base. Each pedestal member has two notches or recesses 44 in its upper edge adapted to be contacted by support pins 45 carried by cushion support frames 12, thereby providing support for the associated frame 12 when said frame is in its prone position.

The illustrated linkage requires some proportioning of the spacing between the various pivot connections; otherwise it will not be possible for one seat cushion to be in an upright position while the other seat cushion is in a prone position. The spacing between pivot connections 33 should be greater than the spacing between pivot connections 39. The spacing between pivot connections 29 should be greater than the spacing between pivot connections 33; in the illustrated construction the spacing between pivot connections 33 is slightly more than one half the spacing between pivot connections 29. The spacing between each pivot connection 29 and the associated pivot connection 33 is substantially greater than the spacing between pivot connections 33.

It will be seen that the length of each cushion support frame 12 (defined as the spacing between end edges 23 and 25) is substantially greater than the horizontal spacing between pivot connections 29. Base 14 is thus relatively short so as not to protrude horizontally to any significant extent beyond either end edge of the prone seat cushion. The base is effectively located at a central point within end limits of the seat structure so that is does not subtract from a person's leg room or cargo space (in a van type vehicle installation).

Seat cushions 10 can be formed of any suitable light weight material. Frames 20 are preferably formed of hollow metal tubing having a square cross section. When used in a vehicle environment the seat structures (frames 20 and cushions 10) will be equipped with seat belts (passenger restraints).

I claim:

1. A reversible seat structure, comprising:

a base having a transverse centerline;

two similarly-constructed cushion support frames, each frame having first and second transverse end edges; said frames being oriented so that said first end edges of the respective frames are relatively close together and said second edges of the respective frames are relatively far apart;

two separate upstanding confronting arm structures; first pivot connections between the lower ends of said arm structures and said base, said pivot connections being located equidistant from said transverse centerline so that either arm structure can swing across the space above the centerline;

second pivot connections between the upper ends of said arm structures and corresponding ones of said cushion support frames at points spaced relatively short distances from the respective first and edges of said frames;

first stabilizer link means extending between said second pivot connections on the respective frames so that said link means is swingably related to the arm structures and to the cushion support frames; and second stabilizer link means having third pivot connections with said cushion support frames at said first end edges of said frames;

said arm structures being swingable respectively toward and away from said transverse centerline so that either one of the cushion support frames assumes an upright position while the other support frame assumes a prone position; and a pedestal mechanism extending upwardly from said base at its transverse centerline to provide support for either frame when said frame is in a prone position; each frame having a support means (45) thereon in pressure contact with the pedestal mechanism when it is in its prone position.

2. The seat structure of claim 1, wherein the spacing between the second pivot connections is greater than the spacing between the third pivot connections.

3. The seat structure of claim 1, wherein the spacing between the second pivot connections is less than the spacing between the first pivot connections.

4. The seat structure of claim 1, wherein the spacing between the second pivot connections is slightly more than one half the spacing between the first pivot connections.

5. The seat structure of claim 1, wherein the spacing of a first pivot connection and a second pivot connection on each arm structure is substantially greater than the spacing between the second pivot connections.

6. The seat structure of claim 1, wherein said second stabilizer link means is located below said first link means when said second pivot connections are equidistant from a vertical extension of said transverse centerline.

7. The seat structure of claim 1 and further comprising an abutment mechanism carried by said second link means for engagement with a selected structure when said selected arm structure is at the limit of its motion away from said transverse centerline.

8. The seat structure of claim 7, wherein said abutment mechanism comprises multiple pin means extending coaxially from said third pivot connections across the movement planes of the associated arm structures.

9. The seat structure of claim 1, wherein the spacing between the end edges on each cushion support frame is substantially greater than the spacing between said first pivot connections, whereby the base does not protrude horizontally to any appreciable extent beyond either end edge of a cushion support frame when that frame is in its prone position.

10. The seat structure of claim 9, wherein said base consists of a horizontal rail structure seatable flatwise on the floor of an automobile so that said first pivot connections are in near proximity to the floor.

11. The seat structure of claim 10, wherein each cushion support frame is spaced an appreciable distance above said base when it is in its prone position.

* * * * *